Aug. 27, 1968  P. B. GREENBERG ET AL  3,398,881
COMPRESSOR BLEED DEVICE
Filed Jan. 10, 1967
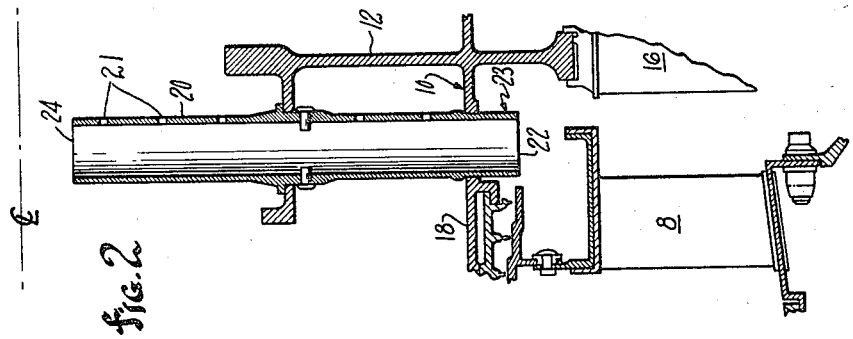
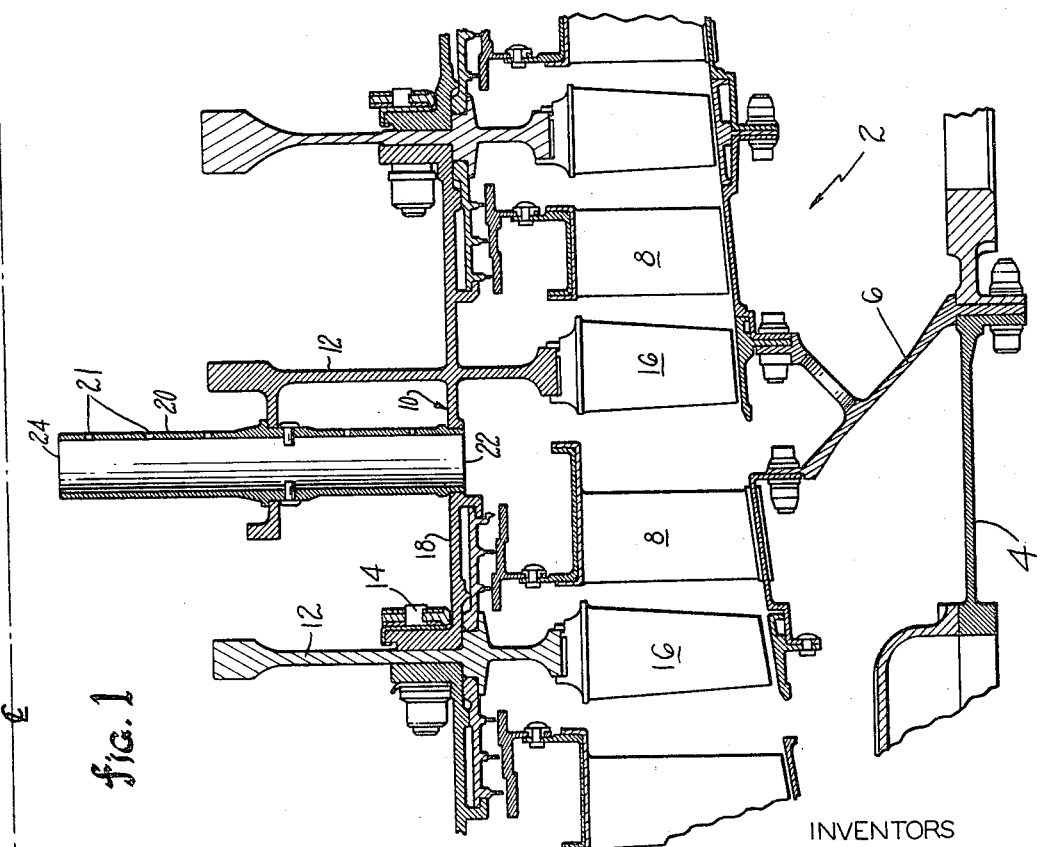
INVENTORS
PAUL B. GREENBERG
ALBERT H. TURNER
BY Charles A. Warren
ATTORNEY United States Patent Office 3,398,881
Patented Aug. 27, 1968

3,398,881
COMPRESSOR BLEED DEVICE
Paul B. Greenberg, Manchester, and Albert H. Turner, East Hampton, Conn., assignors to United Aircraft Corporation, East Hartford, Conn., a corporation of Delaware
Filed Jan. 10, 1967, Ser. No. 608,382
2 Claims. (Cl. 230—122)

ABSTRACT OF THE DISCLOSURE

In a gas turbine engine having a compressor consisting of a hollow rotor, a plurality of rows of axially spaced rotor blades alternating and cooperating between a plurality of rows of vanes, a duct rotating with the compressor rotor for bleeding off air from between adjacent rows of vanes and blades and guiding it internally to the hollow portion of the compressor rotor; the duct causing a minimal pressure drop to occur as the bleed air flows from the high pressure region external of the rotor to the lower pressure region internal of the rotor.

BACKGROUND OF THE INVENTION

This invention relates to multi-staged axial flow fluid compressors, and more particularly to a unique device for bleeding off air from an intermediate stage of the compressor and thence internally of the engine.

The invention described herein is primarily adapted for use in gas turbine engines, but not limited thereto. Normally, gas turbine engines contain a combustion chamber, a turbine and a compressor, driven by the turbine. It is well known in the gas turbine engine art that the efficiency and hence the power output increases with an increase of turbine inlet temperature. One means of permitting the turbine to operate at a higher inlet temperature is by bleeding off air from the compressor and supplying this relatively cooler air to the turbine for cooling purposes.

Compressor bleeding for this purpose is well known and is generally accomplished by a sharp edge orifice. However, from the laws of conservation of momentum, it has been found that in bleeding off air through a sharp edge orifice, a large pressure drop occurs. This pressure drop results from the generation of a number of vortices as the cooling air of high velocity and greater radius travels to an area of lower velocity and lower radius. It is clear that to maintain a cooling flow from the compressor rotor to the turbine, the cooling air pressure must be higher than turbine gas pressure. Therefore, to sustain this cooling flow, and as a result of the aforementioned pressure drop, it is necessary to bleed air from a higher stage within the compressor. This, of course, causes the cooling air to be hotter and necessitates a greater amount of cooling air to maintain the desired temperature level. Bleeding off a greater amount of air, especially from the higher compressor stages, has a decidedly adverse effect on the overall engine performance and efficiency.

One method that the prior art employs to avoid this vortex flow effect consists of placing a paddle wheel arrangement, or some other agitating device within the compressor rotor. The pressure drop, resulting from the laws of conservation of momentum is thereby avoided because the velocity of the air within the rotor is caused to be substantially the same as the air entering since the paddle wheel device causes the air to move at almost the same velocity as the rotor. It should be understood that while this type device may reduce the pressure loss, it also requires a substantial number of parts of considerable weight. This, of course, has an adverse effect on engine performance, cost and weight.

SUMMARY OF INVENTION

It is a primary object of this invention to provide a novel device whereby air can be bled from any intermediate stage of a compressor and guided internal of the compressor with a minimal pressure drop.

The present invention eliminates the vortex flow effect normally encountered when bleeding off air in a compressor and is a novel light weight device which permits bleeding off air from the lower pressure stages within the compressor, this lower pressure and cooler air being at a higher pressure than the turbine gases since most of the pressure drop in the bleeding process has been eliminated. Therefore, a lesser amount of bleed cooling air is required to maintain the desired turbine temperature level and the overall engine efficiency and performance are increased. The bleeding off process is accomplished through at least one radially extending duct, the number of ducts being dependent on the amount of cooling air required. The ducts are attached to the compressor rotor and rotatable therewith, the air that is bled off being discharged through the innermost end of the duct or axially through a plurality of holes in the trailing edge of the ducts.

BRIEF DESCRIPTION OF THE DRAWING

FIGURE 1 is a sectional view of a compressor showing the device of the invention thereof.

FIGURE 2 is a fragmentary sectional view of a compressor showing a second embodiment of the device of the invention.

DESCRIPTION OF THE PREFERRED EMBODIMENT

In a conventional gas turbine engine, air passes through an aligned compressor, combustion section and turbine and is then discharged to atmosphere through an exhaust outlet. For a more complete description of a gas turbine engine, reference is hereby made to the Savin Patent No. 2,747,367 and incorporated herewith.

As shown in FIGURE 1, the compressor is indicated generally by the numeral 2. The compressor consists of a stator casing 4 and extending radially inward from stator casing 4 is flange 6. Connected thereto and supported therefrom are adjacent rows of axially spaced vanes 8. Compressor rotor 10 is hollow and is built up of a plurality of discs 12, these discs being held together by bolts 14. Mounted on discs 12 are rows of axially spaced blades 16. Rows of blades 16 alternate between rows of adjacent vanes 8 and cooperate therebetween.

The outer periphery of hollow rotor 10 consists of a number of rotor disc spacer rings 18 and mounted in and rotatable with rotor disc spacer rings 18 is duct 20. It is to be understood that while only one duct is illustrated, that any number of ducts may be used, the number used being dependent on the amount of cooling flow required. In the embodiment shown in FIGURE 1, the outer edge 22 of duct 20 is flush with the outer diameter of rotor disc spacer rings 18. Duct 20 extends radially inward from the periphery of rotor 10 and is supported in the hollow internal portion of rotor 10 by disc 12. In operation, air from between vanes 8 and rotor blades 16 enters duct 20 at the outer end 22 and flows from this higher pressure region through duct 20 out inner end 24 into the lower pressure region within rotor 10. This cooling air is then directed to the turbine (not shown). It is clear that this invention avoids the problem of pressure drop caused by vortex flow in that the duct 20 is fixed and is rotatable with rotor 10, therefore the radial flow path is fixed and the relative velocities of the air within the rotor and the cooling air are substantially the same. The performance of the duct 20 may be enhanced by inserting holes 21 in the trailing edge of duct 20. These holes 21 have the effect of drawing air out through the holes and discharging the flow axially into the compressor rotor 10.

A second embodiment of the invention is shown in FIGURE 2. In this embodiment duct 20 is extended past the outer periphery of rotor 10. A scoop 23 is placed on the outer end of duct 20. The purpose of the scoop being a more effective means of picking up the air and guiding it through duct 20.

What is claimed is:

1. A multi-stage fluid compressor comprising a hollow rotor, a plurality of axially spaced rows of blades, each of said rows mounted on the periphery of said hollow rotor and extending outwardly therefrom, a stator casing, a plurality of axially spaced rows of vanes connected to said stator casing, said rows of blades alternating between said rows of vanes and cooperating therebetween, wherein the improvement comprises:

at least one duct for bleeding off compressed working fluid from a region of high pressure to a region of lower pressure, said duct being attached to said rotor and rotatable therewith, said duct being positioned between rows of adjacent vanes and blades, said duct extending radially inward from said periphery of said hollow rotor not past the center line of said hollow rotor and the radially inwardly extending portion of said duct having a plurality of holes, the working fluid bled off from the compressor being discharged into the interior spaces of the hollow rotor with a minimal loss due to vortex flow effects.

2. A construction as in claim 1 wherein:
one end of said duct extends past the periphery of said hollow rotor into the stream of said working fluid.

References Cited

UNITED STATES PATENTS

| | | | |
|---|---|---|---|
| 2,636,665 | 4/1953 | Lombard | 253—39.15 |
| 2,618,433 | 11/1952 | Loos et al. | 230—122 |
| 3,031,128 | 4/1962 | Rubbra | 253—39.15 |
| 2,692,724 | 9/1954 | McLeod. | |
| 2,910,268 | 9/1959 | Davies et al. | |
| 2,927,725 | 3/1960 | Rainbow. | |
| 2,830,751 | 4/1958 | Quinn et al. | |

FOREIGN PATENTS

| | | |
|---|---|---|
| 144,361 | 11/1951 | Australia. |
| 619,722 | 3/1949 | Great Britain. |

HENRY F. RADUAZO, *Primary Examiner.*

SAMUEL FEINBERG, *Assistant Examiner.*